(12) United States Patent
Bischoff

(10) Patent No.: US 6,726,559 B2
(45) Date of Patent: Apr. 27, 2004

(54) HARVESTER WITH CONTROL SYSTEM CONSIDERING OPERATOR FEEDBACK

(75) Inventor: Lutz Bischoff, Dellfeld (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/144,960

(22) Filed: May 14, 2002

(65) Prior Publication Data

US 2003/0216158 A1 Nov. 20, 2003

(51) Int. Cl.$^7$ .......................... A01D 75/18; A01F 12/16; A01F 21/00
(52) U.S. Cl. ........................................ 460/1; 56/10.2 R
(58) Field of Search .................. 460/1, 4, 7; 56/10.2 R, 56/10.8, 11.1, 16.4–16.6, 101; 364/424.01, 424.07, 148, 150, 151

(56) References Cited

U.S. PATENT DOCUMENTS

| | | | | |
|---|---|---|---|---|
| 5,463,854 A | * | 11/1995 | Chmielewski et al. ... | 56/10.2 E |
| 5,488,817 A | * | 2/1996 | Paquet et al. ............ | 56/10.2 R |
| 5,586,033 A | | 12/1996 | Hall ....................... | 364/424.07 |
| 5,666,793 A | * | 9/1997 | Bottinger ................ | 56/10.2 R |
| 5,712,782 A | * | 1/1998 | Weigelt et al. ................ | 701/50 |
| 5,889,671 A | * | 3/1999 | Autermann et al. .......... | 700/83 |
| 6,119,442 A | * | 9/2000 | Hale ....................... | 56/10.2 H |
| 6,144,910 A | * | 11/2000 | Scarlett et al. ................ | 701/50 |
| 6,167,337 A | * | 12/2000 | Haack et al. ................. | 701/50 |
| 6,205,384 B1 | | 3/2001 | Diekhans ..................... | 701/50 |

OTHER PUBLICATIONS

U.S. patent application Publication Pub. No.: US2003/0066277 A1, Apr. 10, 2003.

* cited by examiner

*Primary Examiner*—Árpád Fábián Kovács

(57) ABSTRACT

A control system utilizes operator satisfaction information for controlling an agricultural harvesting machine having adjustable crop processing structure. The control system includes actuators for controlling the crop processing structure and a controller connected to the actuators and to quality sensor structure. Information for at least one quality parameter of the harvesting process is entered on an operator input device, the entry being dependent on the level of satisfaction the operator perceives concerning the parameter, and the controller controls the actuators based on the operator satisfaction input. The controller stores information about the relationship between the output of the sensor and the satisfaction entry, and this relationship information is used for subsequent control purposes.

17 Claims, 5 Drawing Sheets

HARVESTER WITH CONTROL SYSTEM CONSIDERING OPERATOR FEEDBACK

FIELD OF THE INVENTION

The present invention relates generally to agricultural implements such as combines and, more specifically, to control of adjustments on such implements.

BACKGROUND OF THE INVENTION

A modern agricultural harvester such as a combine is essentially a factory operating in the field with many interacting and complex adjustments to accommodate continually changing crop, field and machine conditions during harvest. These harvesters normally comprise a number of actuators for controlling process parameters to be set to appropriate operating positions or parameters. Generally, harvesters have controllers for automatic control of the actuators.

Solutions proposed in literature for an automatic machine adjustment have not been able to prove their value in practice. One reason for such inability is that the available sensors (as loss sensors, grain flow sensors, humidity sensors) have to be calibrated at harvest start under changing conditions. In addition, these sensors do not deliver sufficient information in order to adjust the complex system of harvesting speed, threshing cylinder rotations, concave gap, blower rotations and sieve adjustments. According to the respective harvesting conditions, the machine adjustment thus needs to be optimized for reaching the result desired by the operator in the best possible manner. The fine tuning of the machine requires much operator experience and finger tip feeling and is often very time consuming. Such tuning still has to be done by the operator.

Since the effect of different adjustments with respect to different quality criteria is often reciprocal, a number of compromises have to be made. For example, with "sharper threshing" for improving the threshing process, the amount of damaged grain and the straw destruction can increase. With larger sieve openings for reducing cleaning shoe losses, the purity in the grain tank can get worse. The operator can influence the total harvesting performance when he defines priorities for the different quality criteria according to economical requirements.

Examples of previous harvester controllers include those with look-up tables stored in an on-board memory, such as described in U.S. Pat. No. 6,205,384. With such systems, current conditions as a group are compared to groups stored in memory. When current conditions as a group match a stored group, the stored machine settings corresponding to the conditions are used to adjust the machine. New settings can be input by an operator via keyboard. One of the problems with this approach is basically that it is an open-loop approach. Machine settings are determined by historical data stored in the look-up table rather than by control results. As a result, such an open-loop type of system provides no compensation for changes in machine, crop, fields and environments.

Another example of harvester adjustment is shown and described in U.S. Pat. No. 5,586,033 wherein the controller trains a neural network model of the harvester with data. The model is then used to determine harvester settings. The controller comprises an operator interface allowing the operator to input the relative importance of a number of criteria, as grain loss, completeness of threshing, grain damage and dockage. According to the operator-defined relative importance of the criteria and to sensor inputs, the neural network determines the adjustment of the combine working parameters. This system suffers under the lack of sufficient and exact sensor data for getting feedback. Further, neural nets in large size require a prohibitive computational effort.

SUMMARY OF THE INVENTION

It is therefore an object of the present invention to provide an improved control system for an agricultural harvester. It is another object to provide such a system which overcomes most or all of the aforementioned problems.

The control system according to the invention comprises a controller arranged to control operating parameters of adjustable crop processing means of the harvesting machine, which could be a combine or any other harvesting machine, such as a forage harvester in which, for example, the gap between a chopping drum and a shear bar could be controlled. It is proposed that an operator interface device is provided receiving an operator feedback input regarding operator satisfaction with a quality parameter of the harvesting process. The controller uses the inputted information and controls the actuator accordingly. The inputted information can be used by the controller in combination with data from sensors. When different quality parameters are inputted, the operator can define a relative importance of these parameters or a target the operator would like to achieve, as low losses or high harvesting speed. The importance of the targets could also be pre-defined. The controller considers these inputs and controls the actuators accordingly.

Thus, the control system does not rely only on sensors for obtaining feedback information on the quality of the harvesting process, which are suffering under the described disadvantages such as necessity of calibration and insufficient number of data. It would even be possible to dispense with some or all of the sensors for obtaining feedback on the harvesting process.

For an initial setup, operating parameters of the actuators can be read from a memory, preferably according to actual crop characteristics and/or harvest conditions. The latter can be inputted by the operator into the operator interface device, or measured with appropriate sensors. After a certain harvesting time has elapsed, the operator can input information about his satisfaction with the obtained results via the operator interface device. The controller considers the operator input and uses known influences, trends and/or relationships between the quality parameters of the harvesting process and necessary alterations to the actuator operating parameters. The influence, impact or trend of alterations to the parameters upon the quality parameters is known in the art and used by the controller. This process can be repeated until the operator is entirely satisfied with all quality parameters of the harvesting process, or at least the most important quality parameters are accepted.

In a preferred embodiment, the control system of the harvesting machine comprises sensors capable of gaining information on at least one quality parameter of the harvesting process. Data from the sensors and the operator feedback data are stored together. They contain information about the sensor output data and the operator's satisfaction. For subsequent controlling purposes, the control system can, once a sufficient amount of data is stored, dispense with the operator feedback and rely on the sensor values, which are calibrated with the previously gained relationships. These relationships are preferably stored and recalled according to the respective crop characteristics and/or harvest conditions.

These and other objects, features and advantages of the invention will become apparent to one skilled in the art upon reading the following description in view of the drawings.

DESCRIPTION OF THE PREFERRED EMBODIMENT

Figure 1:
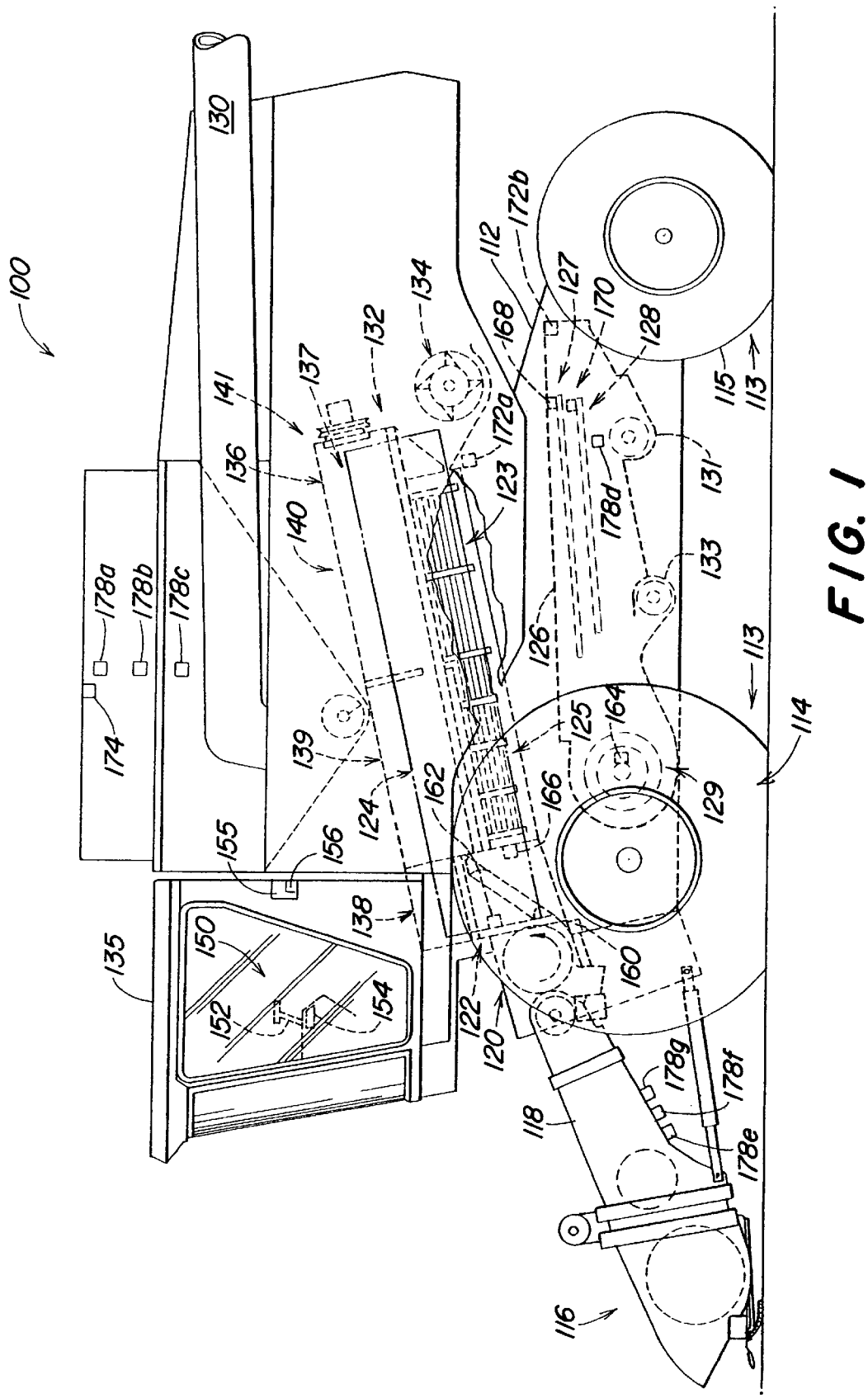
FIG. 1 is a side view of a harvester utilizing the control system of the present invention.

Referring now to FIG. 1, therein is shown an agricultural harvester in the form of a combine 100 comprising a main frame 112 having wheel structure 113 including front and rear ground engaging wheels 114 and 115 supporting the main frame for forward movement over a field of crop to be harvested. The front wheels 114 are driven by an electronically controlled hydrostatic transmission.

A vertically adjustable header or harvesting platform 116 is used for harvesting a crop and directing it to a feederhouse 118. The feederhouse 118 is pivotally connected to the frame 112 and includes a conveyor for conveying the harvested crop to a beater 120. The beater 120 directs the crop upwardly through an inlet transition section 122 to a rotary threshing and separating assembly 124. Other orientations and types of threshing structures and other types of headers 116, such as transverse frame supporting individual row units, could also be utilized.

The rotary threshing and separating assembly 124 threshes and separates the harvested crop material. Grain and chaff fall through a concave 125 and separation grates 123 on the bottom of the assembly 124 to a cleaning system 126, and are cleaned by a chaffer 127 and a sieve 128 and air fan 129. The cleaning system 126 removes the chaff and directs the clean grain to a clean grain tank by a grain auger 133. The clean grain in the tank can be unloaded into a grain cart or truck by unloading auger 130. Tailings fall into the return auger 131 and are conveyed to the rotor 37 where they are threshed a second time.

Threshed and separated straw is discharged from the rotary threshing and separating assembly 124 through an outlet 132 to a discharge beater 134. The discharge beater 134 in turn propels the straw out the rear of the combine. It should be noted that the discharge beater 134 could also discharge crop material other than grain directly to a straw chopper. The operation of the combine is controlled from an operator's cab 135.

The rotary threshing and separating assembly 124 comprises a cylindrical rotor housing 136 and a rotor 137 located inside the housing 136. The front part of the rotor and the rotor housing define the infeed section 138. Downstream from the infeed section 138 are the threshing section 139, the separating section 140 and the discharge section 141. The rotor 137 in the infeed section 138 is provided with a conical rotor drum having helical infeed elements for engaging harvested crop material received from the beater 120 and inlet transition section 122. Immediately downstream from the infeed section 138 is the threshing section 139.

In the threshing section 139 the rotor 137 comprises a cylindrical rotor drum having a number of threshing elements for threshing the harvested crop material received from the infeed section 138. Downstream from the threshing section 139 is the separating section 140 wherein the grain trapped in the threshed crop material is released and falls to the cleaning system 128. The separating section 140 merges into a discharge section 141 where crop material other than grain is expelled from the rotary threshing and separating assembly 124.

An operator's console 150 located in the cab 135 includes conventional operator controls including a hydro shift lever 152 for manually controlling the speed range and output speed of the hydrostatic transmission 114t. An operator interface device 154 in the cab 135 allows entry of information into a controller 155 comprising an on-board processor system, which provides automatic speed control and numerous other control functions described below for the harvester 100. The operator can enter various types of information into the operator interface device 154, including crop type, location, yield and the like.

Signals from the sensors include information on environmental variables such as relative humidity, and information on variables controlled by the on-board control system. Signals include vehicle speed signals from a radar sensor or other conventional ground speed transducer 160, rotor and fan speed signals from transducers 162 and 164, and concave clearance and chaffer and sieve opening signals from transducers 166, 168 and 170, respectively. Additional signals originate from a grain loss sensor 172a at the exit of the rotary threshing and separating assembly 124 and left- and right-hand grain loss sensors 172b at the exit of the cleaning system 126, a grain damage sensor 174 and various other sensor devices on the harvester. Signals from a tank cleanliness sensor 178a, a mass flow sensor 178b, a grain moisture sensor 178c, a tailings volume sensor 178d, and relative humidity, temperature and material moisture sensors 178e, 178f and 178g are also provided.

A bus directs signals from the mentioned sensors and an engine speed monitor, a grain mass flow monitor, and other microcontrollers on the harvester to the controller 155. Signals from the operator interface 154 are also directed to the controller 155. The controller 155 is connected to actuators 202–214 (FIG. 2) for controlling adjustable elements on the implement. Feedback signals from the actuators 202–214 are input to the controller 155.

The actuators controlled by the controller 155 comprise an actuator 202 controlling the rotational speed of the rotary threshing and separating assembly 124, an actuator 204 controlling the clearance of the concave 125, an actuator 206 controlling the opening of a precleaner of the chaffer 127, an actuator 208 controlling the opening width of the chaffer 127, an actuator 210 controlling the opening of the sieve 128, an actuator 212 controlling the speed of the air fan 129, and an actuator 214 controlling the output speed of the hydrostatic transmission and thus the ground speed of the combine. These actuators are known in the art and thus only schematically indicated in FIG. 2.

Figure 2:
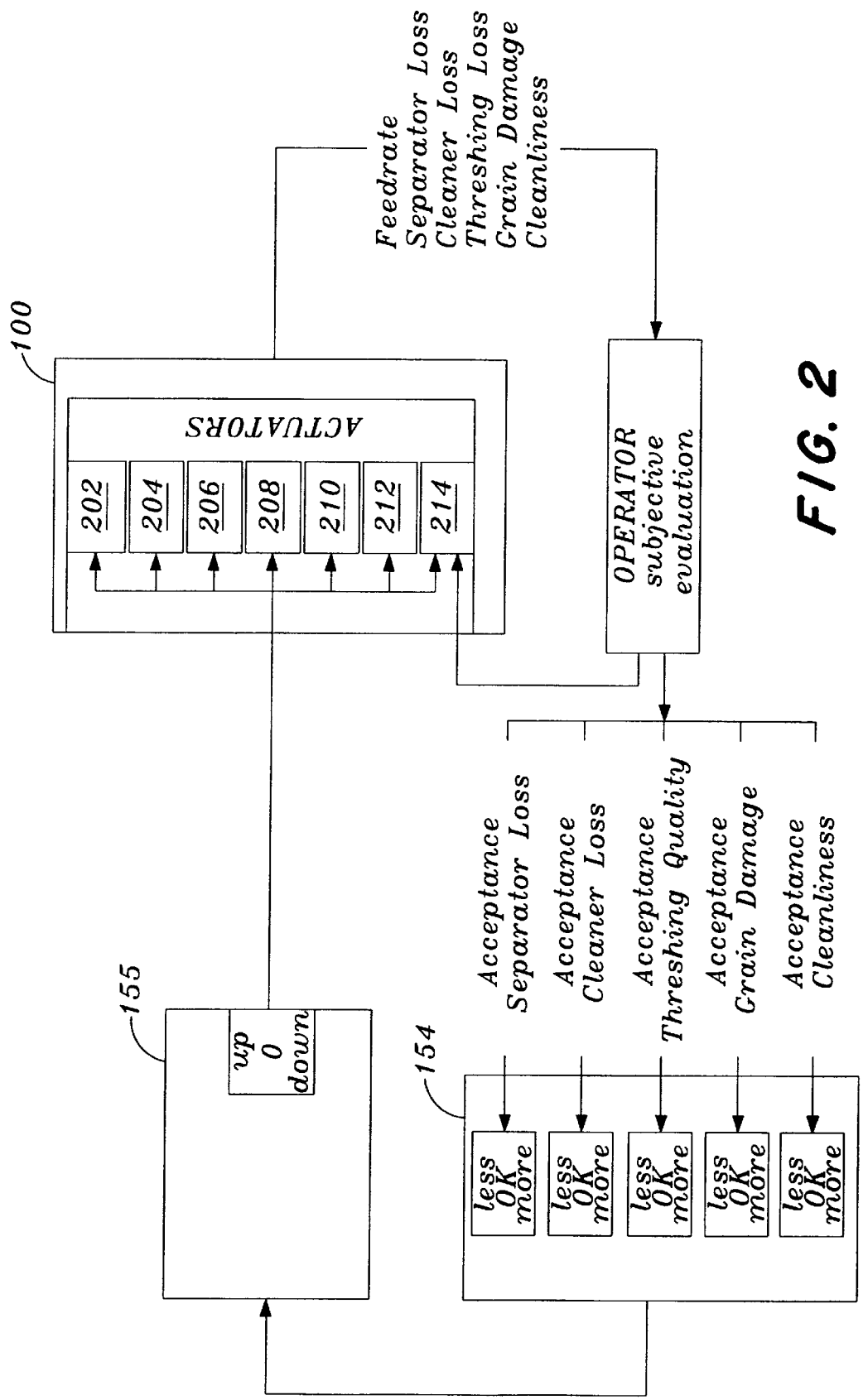
FIG. 2 is a schematic diagram of a first embodiment of a control system of the harvester shown in FIG. 1.
Figure 3:
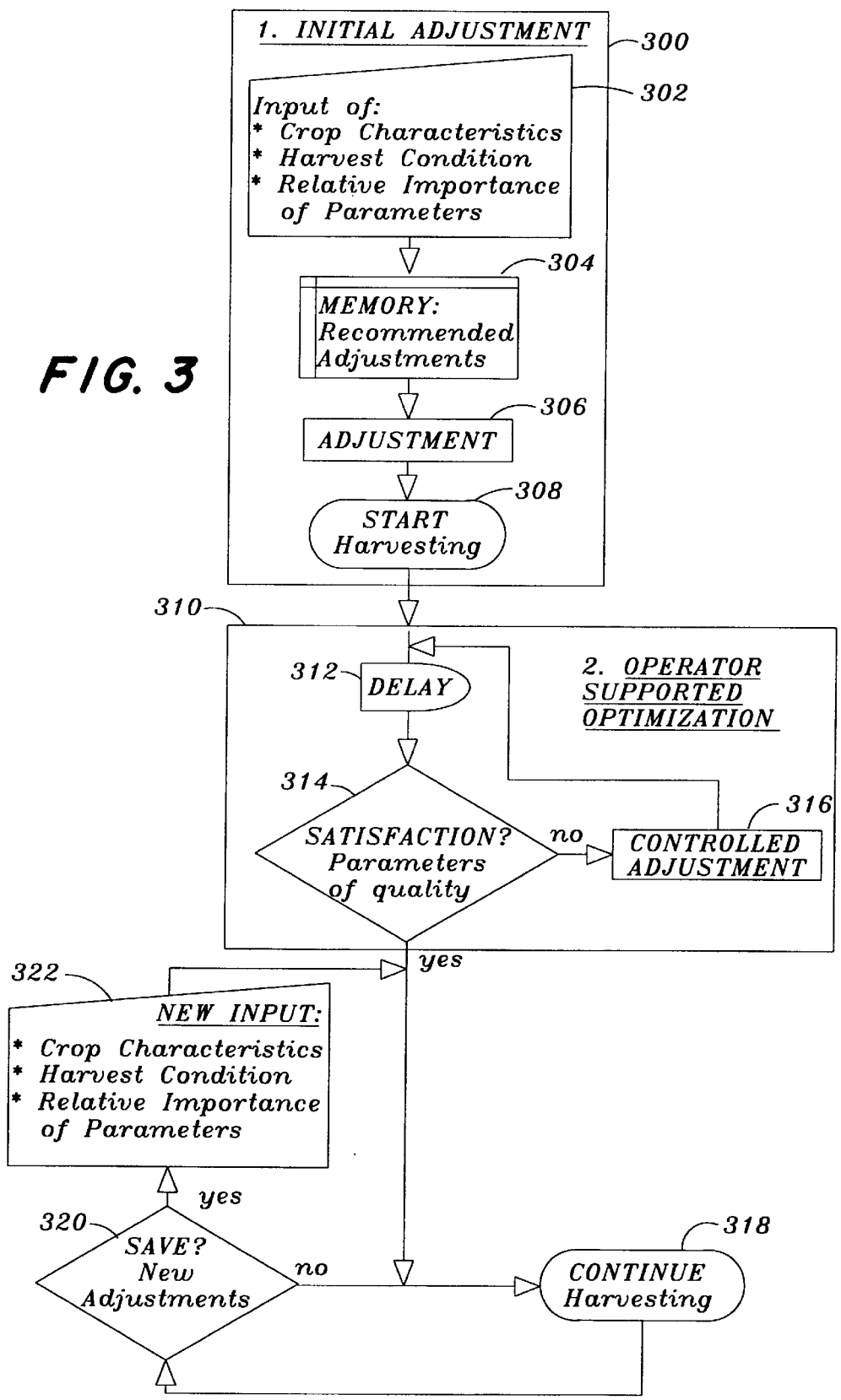
FIG. 3 is a flow diagram indicating the operation of the control system of FIG. 2.

The first embodiment of the control system shown in FIG. 2 operates as schematically indicated in FIG. 3. In a first block, indicated generally with 300, an initial adjustment is performed. Block 300 comprises a number of steps 302–308. At 302, the operator by means of the operator interface device 154 inputs information about the actual crop characteristics, harvest conditions and the relative importance of a number of quality parameters. At 304, recommended adjustments for the actuators 202–214 are read from a memory 156 of the controller 155. It would also be possible to use input from the humidity, temperature and material moisture sensors 178e, 178f and 178g when they are in contact with the crop. At 306, the actuators 202–214 are set into the read positions or operating parameters, whereby the controller 155 may use feedback from the feedback transducers 160, 162, 164, 166, 168 and 170 of the actuators 202–214. Then, the combine 100 harvests a part of the field at 308. The combine speed is controlled by the controller 155, but can be manually influenced by the operator by means of the hydro shift lever 152.

An operator supported optimization block generally indicated with 310 follows the initial adjustment block 300. After a delay in step 312 for obtaining time for a stabilization of the process, the operator can input in step 314 whether he is satisfied with the result of the harvesting process. The delay time can be predefined, or it can end when the operator gives an appropriate input into the operator interface device 154 when according to his opinion a sufficient harvesting time has lapsed. In step 314, the operator inputs into the operator interface device 154, whether a number of quality parameters of the harvesting process are too high, acceptable, or too low. In another embodiment, the operator could simply input whether the quality parameters are considered as acceptable or not. These quality parameters are in this embodiment the grain loss of the rotary threshing and separating assembly 124, the grain loss of the cleaning system 126, the threshing quality of the threshing section 139, the grain damage and the dockage of the material in the clean grain tank. The operator may have to stop the combine 10, leave the operator's cab 135 and check the respective parameters visually and/or by means of suited instruments as containers for collecting lost grain. When in step 314, any of the quality parameters of the harvesting process is not acceptable, step 316 is performed, in which the controller 155 adjusts the actuators 202–214 according to known impacts, influences or relationships or trends between the acceptability of the operating parameters and the position or operating parameters of the actuators. These relationships are incorporated in programs running in the controller. The controller 155 makes use of the fact that the trend of the effects caused by adjusting a functional element of the combine 100 is known. The controller 155 is an intelligent system taking over the methods according to which an experienced operator would proceed during adjusting the combine 10. For performing this task, the controller 155 may incorporate functions of a fuzzy controller as described in U.S. Pat. No. 6,315,658 or a neuronal network as disclosed in U.S. Pat. No. 5,586,033 the disclosure of both references being incorporated herein by reference. Thus, when for example the cleaner loss is considered as too high, the controller 155 will open the precleaner, the chaffer 127 and the sieve 128. All or a number of the remaining actuators 208–214 may have to be adjusted, as well. Step 316 is followed again by step 312. The controller 155 hence brings the actuators 208–214 in cooperation with the operator in an iterative manner into positions or operating parameters yielding a desired quality of the harvesting process. Thereby, the inputted relative importance of the parameters is considered.

When step 314 reveals that all quality parameters of the harvesting process are acceptable, step 318 is performed, in which harvesting is continued. Step 320 can be executed by an appropriate input into the operator interface device 154. Then, in step 322 the actual operating parameters of the actuators 208–214 are stored in memory 156 together with information about the inputted and/or measured harvesting conditions and the relative importance of the parameters. The operating parameters will be recalled in subsequent executions of step 304.

It should be noted that the first embodiment of the invention shown in FIGS. 2 and 3 does not make use of the grain loss sensors 172a, 172b, the grain damage sensor 174, the tank cleanliness sensor 178a, the mass flow sensor 178b, the grain moisture sensor 178c and the tailings volume sensor 178d. Thus, calibration problems of the sensors are avoided, and it would even be possible to dispense with the sensors.

Figure 4:
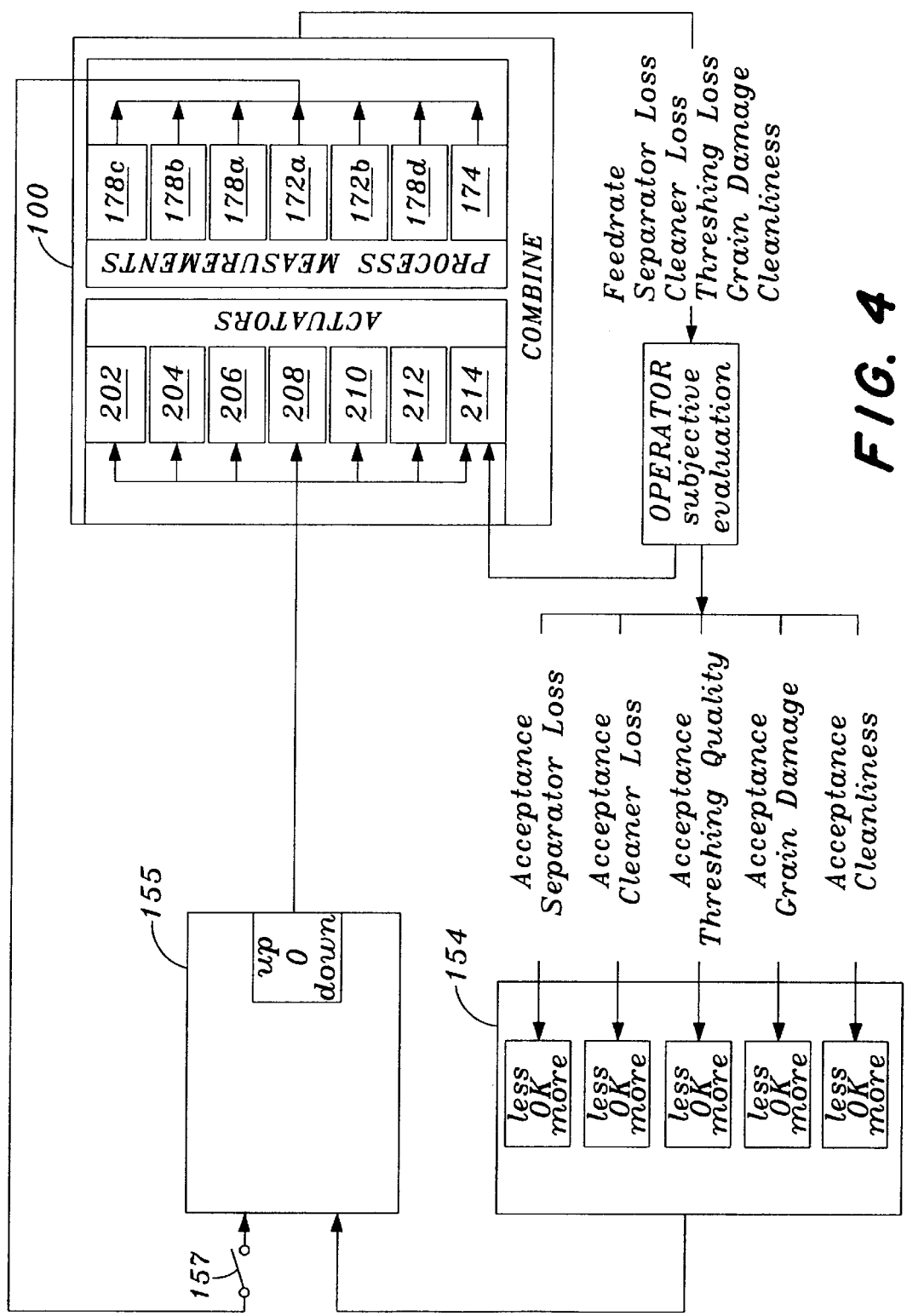
FIG. 4 is a schematic diagram of a second embodiment of a control system of the harvester shown in FIG. 1.

On the other hand, the second embodiment of the controller 155 shown in FIG. 4 uses the outputs of the various sensors. In the second embodiment, comparable elements have the same reference numerals as those of the first embodiment. The controller 155 is connected to the grain loss sensors 172a, 172b, the grain damage sensor 174, the tank cleanliness sensor 178a, the mass flow sensor 178b and the grain moisture sensor 178c. It would also be possible to provide signals from at least one of a sensor sensing the straw humidity, a sensor sensing the throughput rate of the combine 100 by measuring the drive torque of the rotary threshing and separating assembly 124 or the thickness of the crop mat in the feederhouse 118, and a sensor sensing the part of the grain separated in the threshing section 139. As in the first embodiment, the operator can input via the operator interface device 154 whether he considers quality parameters of the harvesting process as too high, too low or acceptable. In another embodiment, he just has the choice between acceptable and not acceptable parameters. A switch 157 allows the operator to switch between an automatic mode and a manual mode, in which the sensor signals are not considered and the controller works only based upon the operator inputs.

Figure 5:
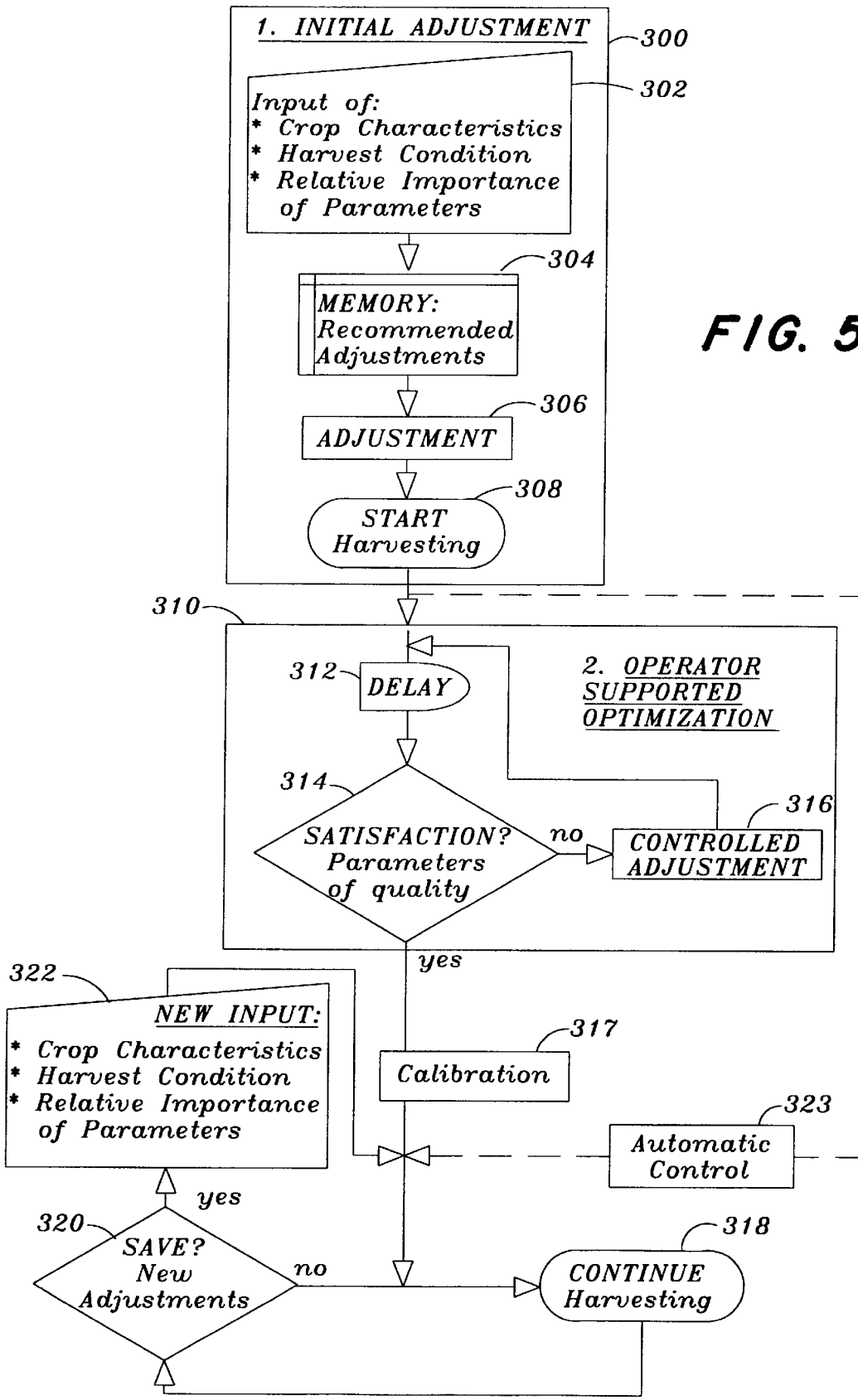
FIG. 5 is a flow diagram indicating the operation of the control system of FIG. 4.

The operation of the control system according to the second embodiment is represented in FIG. 5. The first block 300, the initial adjustment, is identical with block 300 in FIG. 3. The actuators 202–214 of the combine are thus set in sub-steps 302–308 to positions or operating parameters read from memory 156 according to inputted and/or measured conditions. Additionally, the relative importance of the parameters is inputted. The second block is also generally indicated as 310, since it is identical with the operator supported optimization process block 310 in FIG. 3. The operator thus checks whether the quality parameters of the harvesting process are acceptable or too high or too low (respectively acceptable or not), and makes corresponding inputs to the operator interface device 154. The controller 155 adjusts the actuators 202–214 as described above, using known relationships or trends between the quality parameters and the actuator values. When the operator is content with all quality parameters, step 317 follows step 314. At 317, an information about the values provided by the sensors 172a, 172b, 174 and 178a–178d is stored in memory 156, preferably together with the information on the actual crop characteristics and harvest conditions inputted and/or measured in step 302. In the disclosed embodiment, the fact that the sensor values are stored is already indicating that the operator is satisfied with the quality parameters, since otherwise step 317 would not be reached. The memory 156 is hence provided with information about the sensor outputs, knowing that the operator has accepted the quality parameters. Consequently, information that can be considered as calibration information of the sensors is obtained and stored. It should be noted that step 317 can also be performed before or after step 316, thus during the optimization process. Then, operator inputs into the operator interface device regarding the acceptance of the quality parameters of the harvesting process would be stored together with the sensor values. Steps 318–322, as in FIG. 3, follow step 317.

The advantage of the calibration step 317 is that calibration information regarding the sensors 172a, 172b, 174 and 178a–178d is available. This can be used for future harvesting tasks as indicated by the dotted lines and step 323 in FIG. 5, in which block 310 is omitted and the actuators 202–214 are controlled by the controller based on the sensor outputs using the calibration information. The information about the actual crop characteristics and harvest conditions and the crop characteristics and harvest conditions at the time the calibration information was obtained, is considered, as well, as the relative importance of the parameters. When the operator should notice that the quality parameters are not acceptable in the automatic mode, he can initiate another execution of block 310 by an appropriate input into the operator interface device 154.

Having described the preferred embodiment, it will become apparent that various modifications can be made without departing from the scope of the invention as defined in the accompanying claims. Although the harvester is shown as a combine, the system described above is also suitable for use with other harvesters as well as other implements having interacting and complex adjustments to accommodate various types of continually changing operating conditions. The system described is particularly adaptable, for example, to many agricultural and construction implements wherein sensor and feedback information is relatively imprecise.

What is claimed is:

1. A control system for controlling an agricultural harvesting machine having an adjustable crop processor affecting quality parameters of the harvesting process, the control system comprising actuators arranged to control operating parameters of the crop processor, and a controller arranged to automatically control the actuators, characterized in that an operator interface device is connected to the controller to input to the controller an operator input containing information about the level of operator's satisfaction with at least one quality parameter of the harvesting process, the level of operator's satisfaction including a satisfied level and a dissatisfied level, and wherein the controller is responsive to the level of operator's satisfaction to automatically control the actuators based on the operator input.

2. A control system as claimed in claim 1, characterized in that the controller is connected to a memory containing initial operating parameters of the actuators based on information on at least one of actual crop characteristics and harvest conditions.

3. A control system as claimed in claim 2 including a condition sensor, characterized in that the information on at least one of actual crop characteristics and harvest conditions is at least one measured by the condition sensor and inputted to the controller via the operator interface device.

4. A control system as claimed in claim 1, characterized in that the controller is responsive to harvest initiation and receives the level of operator's satisfaction with at least one of the quality parameters of the harvesting process after a delay following the harvest initiation.

5. A control system as claimed in claim 1, characterized in that the controller receives the operator input repeatedly until the operator input indicates the satisfied level.

6. A control system as claimed in claim 1, characterized in that the controller stores information on operating parameters of the crop processor and information on correlation between changes in the operating parameters and changes in the quality parameters of the harvesting process.

7. A control system as claimed in claim 1, characterized in that the operator input includes quality information on at least two quality parameters and the controller is responsive to the quality information to control the actuators.

8. A control system as claimed in claim 1, characterized in that the controller is connected to at least one sensor arranged to measure at least one of the quality parameters of the harvesting process and provide a sensor output indicative of the quality parameter measured, and that the controller includes a memory for storing information about the sensor output and related information about the inputted level of operator's satisfaction with the quality parameter measured, including whether the satisfied level or the dissatisfied level is indicated for the quality parameter.

9. A control system as claimed in claim 8, characterized in that the memory stores information on the sensor output and the related information about the inputted level of operator's satisfaction in dependence on whether the satisfied or dissatisfied level is indicated.

10. A control system as claimed in claim 8, characterized in that the controller is responsive to the sensor output, and to the previously stored information on the sensor output and the related information about the inputted level of operator's satisfaction with the quality parameter including whether the satisfied level or the dissatisfied level is indicated for the quality parameter.

11. A control system as claimed in claim 8, characterized in that the memory stores the information about the relationship between the sensor output and the related inputted information about the level of operator's satisfaction with the quality parameter together with information on at least one of actual crop characteristics and harvest conditions.

12. A control system as claimed in claim 10, characterized in that the controller is responsive to information on at least one of actual crop characteristics and harvest conditions when the relationship between the output of the sensor and the related inputted information about the operator's satisfaction with the quality parameter was recorded, to control the actuators.

13. A method of controlling an agricultural harvesting machine having adjustable crop processing structure affecting quality parameters of the harvesting process, wherein a controller controls actuators influencing operating parameters of the crop processing structure, the method comprising the steps of:

a. providing an operator interface device;
   b. inputting operator information for at least one of the quality parameters of the harvesting process to the operator interface device, the step of inputting including providing a satisfaction indication when an operator is satisfied with said at least one of the quality parameters of the harvesting process and providing a dissatisfaction indication when the operator is dissatisfied with said at least one of the quality parameters of the harvesting process; and
   c. automatically controlling the actuators with the controller based on the inputted operator information, wherein the step of automatically controlling includes controlling the actuators dependent on whether a satisfaction indication or a dissatisfaction indication is provided.

14. The method as set forth in claim 13 including the step of receiving the operator information at the controller from the operator interface device until the satisfaction indication is provided.

15. The method as set forth in claim 13 including:
  providing at least one sensor having an output indicative of one or more of the quality parameters of the harvesting process, and
  storing information in the controller about the relationship between the output of the sensor and the associated inputted information about operator satisfaction with the quality parameter.

16. The method as set forth in claim 15 wherein the step of controlling the actuators with the controller includes controlling the actuators based on the output of the sensor and on the information previously stored about the relationship between the output of the sensor and the associated inputted information.

17. The method as set forth in claim 13 wherein the step of providing a dissatisfaction indication includes providing a quality high indication to the controller when one or more of the quality parameters is greater than a first level of quality and providing a quality low indication to the controller when one or more of the quality parameters is less than a second level of quality.

* * * * *